June 14, 1960
B. R. TEGGE ET AL
2,940,960
PROCESS FOR RECOVERING POLYMERS
Filed May 15, 1957
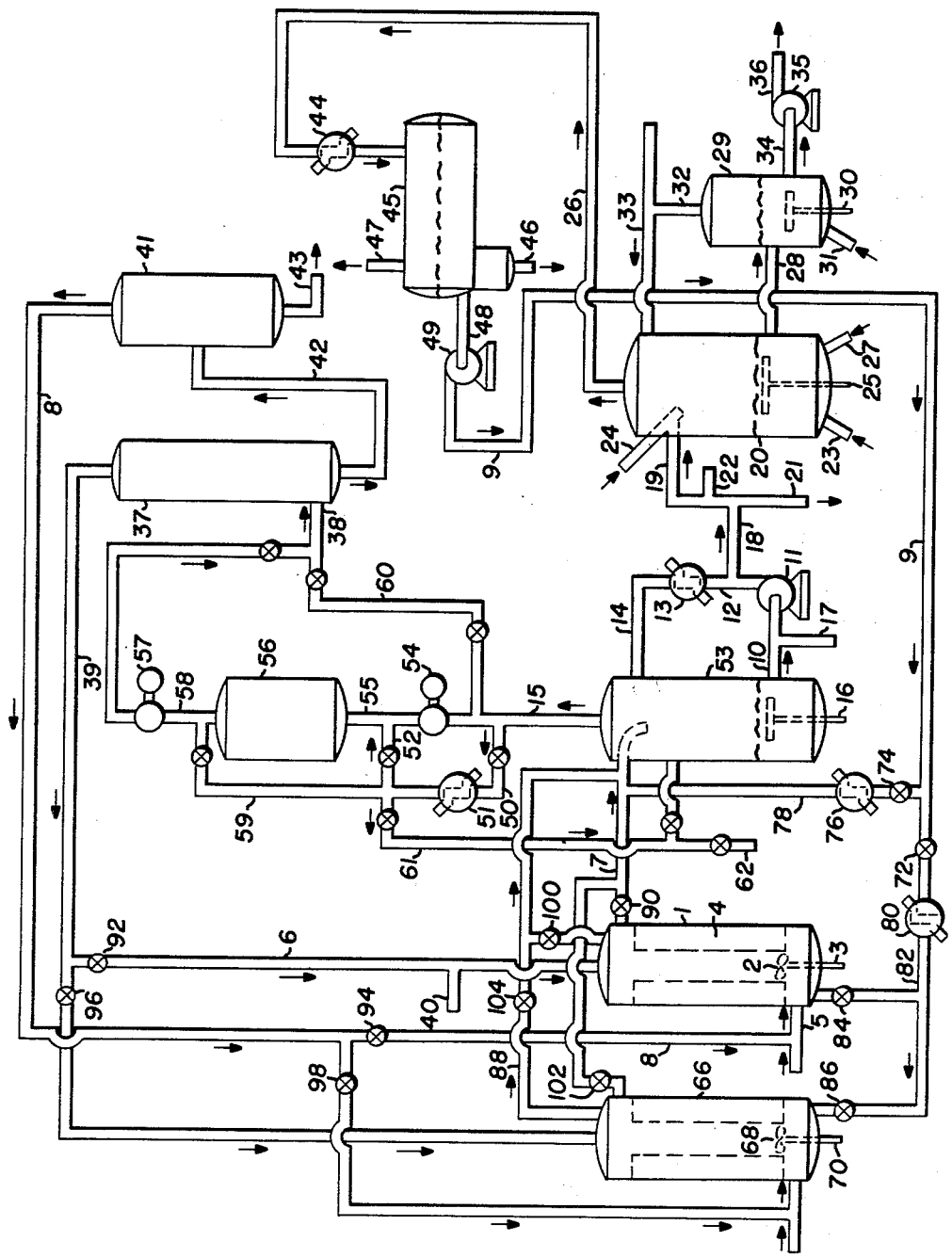
Bruce R. Tegge
John F. Ryan
Lewis D. Etherington
John L. Bryan, Jr
Inventors
By *H. H. Smyers*
Attorney

2,940,960
PROCESS FOR RECOVERING POLYMERS

Bruce R. Tegge, Madison, and John F. Ryan and Lewis D. Etherington, Westfield, and John L. Bryan, Jr., Summit, N.J., assignors to Esso Research and Engineering Company, a corporation of Delaware Filed May 15, 1957, Ser. No. 659,302

17 Claims. (Cl. 260—85.3)

This invention relates to improved processes for the production and recovery of certain homopolymers and copolymers. More particularly, the present invention relates to improved methods of dissolving and processing for product recovery polyisoolefins or copolymers of isoolefins with multiolefins and/or monoolefinic compounds containing a cyclic nucleus. The invention further relates to an improved method of removing deposits of such homopolymers or copolymers from the polymerization reaction zone in which they were produced.

Broadly stated, the process of the present invention comprises contacting a low temperature isoolefin containing-homopolymer or copolymer slurried in a diluent at a higher temperature with a volatilized super heated solvent boiling above the boiling point of the diluent at conditions adapted to volatilize diluent and dissolve at least a substantial proportion of the polymeric material in the solvent. Other embodiments of the present invention, which will be more fully described hereinafter, comprise recycling diluent to form additional slurry, utilizing a minor proportion of the volatilized solvent in liquid form to periodically wash an off stream reactor free of polymer or copolymer, and removing solvent from the polymer or copolymer by means of certain higher boiling media with the subsequent recycling of solvent in vapor form to produce additional polymer or copolymer solution.

The invention will be best understood by the following description wherein reference will be made to the accompanying drawing in which the single figure is a diagrammatic representation in the form of a flow plan depicting a typical process in accordance with the present invention.

By prior art processes, in order to obtain high yields of polymers, polyisoolefins or copolymers of isoolefins with multiolefins and/or monoolefinic compounds containing a cyclic nucleus are commercially produced in a diluent which is a non-solvent for the polymer or copolymer formed, such as $C_1$ to $C_3$ alkyl halides having boiling points below that of water. When polymerizing $C_4$ to $C_8$ isoolefins such as isobutylene, 2-methyl-1-butene, and 3-methyl-1-butene or the like along with minor proportions of $C_4$ to $C_{14}$ multiolefins such as isoprene, butadiene, dimethyl butadiene, piperylene, dimethyallyl, alloocymene, cyclo pentadiene, myrcene, vinyl fulvenes or the like and/or such mono olefinic compounds containing a cyclic nucleus as styrene, alpha methyl styrene, para methyl styrene, para chloro styrene, dichloro styrene, dihydro naphthalene, indene, etc., the polymerization reactions are performed at temperatures of below 0° C. and preferably below about −50° C. down to about −200° C. The polymer or copolymer which is produced in a reaction zone is in the form of a slurry in the alkyl halide diluent. This slurry is then conventionally caused to flow into a flash drum where it is contacted with steam to remove volatile materials and with hot water to reslurry the polymer or copolymer in aqueous suspension. The polymeric material is then conventionally recovered by filtration, degassing extrusion, and drying or the like. The polymer or copolymer as recovered has a Staudinger molecular weight of between about 2,000 and 1,000,000, advantageously between about 5,000 and 500,000, and preferably between about 10,000 and 300,000.

Although best yields of polymer or copolymer of narrow molecular weight distribution are obtained when the polymeric material is produced as a slurry as outlined above, in many instances the resulting dried polymer must be subsequently dissolved in a solvent such as an inert hydrocarbon in order to facilitate the homogeneous blending of the polymer or copolymer with pigments, oils, waxes, asphalts, resins, plasticizers, and the like. Also, where it is desired to chemically modify a polymer or copolymer by halogenation, nitration or the like, such modifications are best performed while the polymeric material is dissolved in a solvent. However, any known process of dissolving such polymeric materials is time consuming and expensive. The dissolution time varies depending upon the molecular weight of the polymer or copolymer from a few minutes up to several hours or more, providing reasonably efficient agitating, churning or homogenizing means are employed.

In accordance with the present invention, there is provided an inexpensive and substantially instantaneous process of dissolving high yields of undissolved polymers or copolymers so as to facilitate subsequent blending with the materials above mentioned or the chemical modification thereof. This is accomplished by contacting the polymer or copolymer slurried at a temperature of about −100° to 0° C. in the $C_1$ to $C_3$ alkyl halide diluent (preferably the reactor effluent slurry) at a higher temperature, preferably between about 0° and 100° C., with a solvent such as a $C_5$ to $C_{10}$ hydrocarbon which has been vaporized and preferably super heated to a temperature of between about 100° and 250° C. under conditions adapted to volatilize diluent and dissolve the polymeric material in the solvent. By thus vaporizing the solvent, say to a temperature of about 50° C. (i.e., 90° F.) above its boiling point, the vaporizer exchange area required is only about one-sixth or one-eighth the area of a solution exchanger due to the far better coefficients of heat transfer for the former case.

When practicing the process of the present invention, it is preferred to condense the alkyl halide vapors formed and recycle the same in the liquid form to the reactor to produce additional slurry. The resulting polymer or copolymer-containing solution is then processed in any desirable manner such as by stripping out unreacted olefins, preferably with solvent vapors, and then contacting the olefin-free solution with a chemical agent capable of modifying the polymer or copolymer.

Alternatively the polymer or copolymer-containing solution is blended with minor proportions of such materials as oils, pigments, waxes, asphalts, resins, plasticizers, etc. The thus modified polymer or copolymer dissolved in the solvent may then be contacted with a higher boiling solvent or non-solvent medium such as an aqueous medium boiling above the boiling point of the solvent under conditions adapted to volatilize the solvent, the solvent vapors formed being superheated and recycled in vapor form to dissolve additional polymeric material. Alternatively, the polymeric material is blended while well dissolved in the solvent with such materials as oils, waxes, asphalts, resins, or plasticizers; these materials serving as the higher boiling medium to drive off the solvent without the further addition of other higher boiling solvents or non-solvents such as water.

For the purposes of the present invention, the alkyl halide diluent is preferably an unreactive $C_1$ to $C_3$ alkyl halide which is a solvent for the monomer and catalyst but not for the rubbery polymer at polymerization conditions and which does not form a complex with the catalyst. Suitable diluents falling within the foregoing class of alkyl halides are methyl chloride, methylene chloride, ethyl chloride, ethylene chloride, methyl fluoride, ethyl fluoride, ethylene fluoride, 1-fluoro-2-fluoroethane, 1-fluoro-2-2′-difluoroethane, perfluoropropane, etc. The alkyl chlorides preferably contain one to two carbon atoms whereas the preferred alkyl fluorides contain one to three carbon atoms. Methyl fluoride, and, for economic reasons, even more especially methyl chloride are the preferred alkyl halides.

Suitable hydrocarbon solvents include $C_4$ to $C_{10}$, advantageously $C_5$ to $C_9$, preferably $C_6$ to $C_8$ hydrocarbons such as normal or iso-paraffins including butane, hexane, heptane, octane, isohexane, isooctane; naphthenes such as cyclohexane and methyl cyclohexane; aromatic hydrocarbons such as benzene, toluene and xylenes; monoolefins such as hexenes, heptenes, octenes; hydrocarbon fractions or hydrogenated hydrocarbon fractions such as naphthas, gasolines, straight run mineral spirits; very light fractions of cracked gas oil or kerosenes; mixtures thereof, etc. Preferred solvents include substantially saturated hydrocarbons such as heptane, hexane, isooctane, cyclohexane, benzene, hydrogenated naphthas and hydrogenated gasolines.

In one embodiment of the present invention, polyisoolefins and especially polyisobutylene having a Staudinger molecular weight between about 5,000 and 30,000, and preferably between about 10,000 and 25,000 are desirably produced as a slurry in a diluent, the diluent being replaced by a hydrocarbon solvent and this hydrocarbon solvent being volatilized while the polyisoolefin is being homogeneously blended with a higher boiling medium such as a mineral lubricating oil. The same general process applies to the addition of copolymers of isoolefins with minor proportions, preferably about 10 to 40 weight percent based on copolymer, of a vinyl aromatic hydrocarbon such as styrene to mineral lubricating oils. In both cases, the polymer or copolymer serves as a valuable V. I. improver and is advantageously added to a lubricating oil predispersed as a concentration in a relatively small amount of lubricating oil by the blending process hereinbefore described.

Pressure sensitive tapes and adhesive plasters may also be made from polyisoolefins or isoolefin-vinyl aromatic hydrocarbon copolymers having Staudinger molecular weights between about 10,000 and 1,000,000 dissolved in $C_5$ to $C_{10}$ hydrocarbons in the manner disclosed in accordance with the present invention. Also, blends of about 15 to 40 weight percent of polymers or copolymers having molecular weights of between about 30,000 and 120,000 with about 60 to 85 weight percent of paraffin wax may be obtained in accordance with the present invention by replacing the polymerization diluent with a $C_5$ to $C_{10}$ hydrocarbon and replacing this hydrocarbon with the higher boiling paraffin wax. Such polymer and wax blends have utility in dairy and other waxes which are resistant to cracking at low temperatures.

It is also within the purview of the present invention to blend about 0.05 to 5.0, and preferably about 0.5 to 3.0 parts by weight of polyisoolefins or copolymers of isoolefins and minor proportions of say about 10 to 40 weight percent of vinyl aromatic hydrocarbons with about 95 to 99.95 weight percent and preferably about 97 to 99.5 weight percent of asphalt. The inclusion of such small amounts of homopolymers or especially copolymers has been found to render the asphalt less brittle at low temperatures and tougher at high temperatures.

The procedure in accordance with the present invention also facilitates the rapid and uniform addition of oils and pigments to high yields of rubbery copolymers of isoolefins and multiolefins such as butyl rubber since the copolymers are dissolved in solvents. The process of the invention furthermore facilitates the continuous production and processing of extremely high molecular weight butyl rubber. Butyl rubber, produced in accordance with the invention may be rapidly and continuously produced, shipped and stored as a viscous 10 to 20 weight percent solution in a hydrocarbon solvent, as a rubber cement containing, for example, about 20 to 30 weight percent solids, as oil-extended rubber compositions, or as compositions containing butyl rubber with a suitable filler or pigment dispersed therein. In the case of pigment addition and/or oil dispersion, the process of the invention eliminates time consuming and expensive batchwise kneading of butyl rubber with a pigment or oil in a Banbury mixer or on a rubber mill. The resulting butyl rubber compounded with pigments and/or oils is also a more homogeneous composition of superior quality for use in tires, hosing, insulation, rubber window channels, etc.

Also, while it has been difficult in the past to extend very high molecular weight butyl rubber with plasticizers such as oils, tars, waxes, organic phosphates, or resins; according to the process of the present invention, any desired degree of such oil extension is rapidly accomplished since the butyl rubber is in solution. This higher proportion of plasticizer oil results in distinct technical and economical advantages. For instance, oil extension of the rubber decreases the product cost since oil is much cheaper than butyl rubber. Furthermore, oil extension of high molecular weight butyl rubber greatly increases abrasion resistance as compared to high molecular weight butyl rubber per se. Often heretofore, oil extension of high molecular weight butyl rubber (e.g., viscosity average molecular weight above about 800,000) has been accomplished by hot milling which greatly degraded the molecular weight of the rubber into a lower molecular weight polymer. Oil addition, in accordance with the invention, prior to removal of the butyl rubber slovent reduces this degradation or breakdown.

Similar advantages are derived from the addition of pigments, sulfur, zinc oxide, amines, or accelerators to the alkyl halide flash drum. Suitable pigments include carbon blacks, silica, hydrated silicas such as Hi-Sil 202, clays, etc. Resin-tackifiers such as urea-aldehyde resins, phenolic-aldehyde type resins (such as a resorcinol formaldehyde resin) or phenol dialcohol resins, or the like, are also advantageously added to butyl rubber dissolved in accordance with the present invention.

The production of a butyl rubber latex in accordance with the invention is also advantageous. The butyl rubber dissolved in the hydrocarbon in the alkyl halide flash drum may be processed into an emulsion by an inversion technique in which an emulsifier and water are added to the rubbery butyl polymer solution to form a water-in-polymer emulsion which is then inverted to a polymer-in-water emulsion by the further addition of water. The emulsifiers useful in accordance with the invention may be of the non-ionic, anionic or cationic type. The non-ionic emulsifiers found most useful are the poly oxyalkenated alkyl phenols or alcohols having the formula $R(OCHR_1CHR_1)_nOH$ where R is an alkyl, aryl, alkaryl or aralkyl group, $R_1$ being an alkyl group or hydrogen and $n$ being an integer of about 4 to 10 or higher. The alkene oxide units should represent at least about 40% of the total molecular weight of the compound. These compounds are prepared by condensing an alkyl phenol or an alcohol with a lower alkylene oxide such as ethylene oxide or propylene oxide. The anionic emulsifiers useful for the purposes of the present invention include such materials as sodium lauryl sulfate, the sodium salt of the sulfonates of the poly oxyethylated alkyl phenols, sodium oleyl taurate, fatty acid soaps of alkali metals, etc.

The cationic emulsifiers which are particularly useful for the purposes of the invention include alkyl dimethyl benzyl ammonium chlorides, diisobutyl phenoxy-ethoxy-ethyl dimethyl benzyl ammonium chloride, dimethyl phenoxy-ethoxyethyl dimethyl benzyl ammonium chloride, etc. The amount of the emulsifier is generally between about 0.2 and 15.0 weight percent, preferably between about 0.5 and 5.0 weight percent, based on polymer.

A particularly advantageous emulsifying combination is an admixture of about 0.5 to 5.0 parts by weight each of potassium oleate, hydrolyzed polyvinyl alcohol, and a poly oxyethylated alkyl phenol sold under the name of Triton X–100.

The butyl rubber solution, before homogenizing into a latex, is advantageously concentrated (if necessary) to about 15 to 50, preferably to about 20 to 30 weight percent polymer content by heating and/or flashing off sufficient hydrocarbon solvent. The concentrating step minimizes forming difficulties in subsequent emulsion stripping operations. It is also preferred to concentrate the butyl rubber solution as above-mentioned before mixing with the emulsifiers, and for this reason their addition is preferably in a zone removed from the alkyl halide flash drum.

The resulting mixture, containing butyl rubber dissolved in a hydrocarbon solvent, water, and emulsifiers, is then preferably pumped into a conventional mixing means or dispersator, generally of the impellor type, to give a crude emulsion. This crude emulsion is then fed to a highly efficient mixing machine such as a colloid mill or a sonic mixer (e.g., a Rapisonic Homogenizer). This emulsion is either recycled through the homogenizer a number of times or fed consecutively to about 2 to 10 homogenizers to obtain a fine emulsion of the desired stability. The emulsion from the last homogenizer stage is pumped to a hydrocarbon volatilizing means, preferably about 1 to 5 evaporators known as Turba-Film evaporators for removal of the hydrocarbon solvent and some of the water whereby a latex of the desired concentration is obtained. The resulting latex generally contains about 30 to 70 weight percent, preferably about 40 to 60 weight percent (e.g., 50 weight percent) butyl rubber. The aforesaid evaporators are generally operated at temperatures of between about 100° and 220° F. and under about 1 to 20 p.s.i.a. pressure to obtain maximum capacity for evaporation. The latex product formed is advantageously stored in agitated tanks equipped with means for heating and cooling for winter and summer operations. At least a portion of the carbon black or other filler used for compounding prior to vulcanization may also be added to the butyl rubber latex. This addition makes subsequent carbon black addition easier and results in better overall carbon black dispersion.

In order to more fully illustrate the present invention, the following experimental data are given. Referring now in detail to the drawing, the apparatus shown is suitable for the process of the present invention. There are provided at least two (e.g. two to five) polymerization reactors, namely, reactors 1 and 66, each equipped with stirrers 2 and 68, carried on shafts 3 and 70 respectively. A polymerizable feed comprising an admixture of about 85 to 99.5 weight percent (e.g., 98 weight percent) of a $C_4$ to $C_8$ isoolefin such as isobutylene of at least 98% purity (e.g., 99% purity) and about 0.5 to 15 weight percent (e.g., 2.0 weight percent) of a $C_4$ to $C_{10}$ conjugated multiolefin such as isoprene of at least about 90% purity (e.g., 95% purity) is continuously charged to reactor 1 via conduit 5 along with about 1 to 5 volumes (e.g., 3 volumes) of a $C_1$ to $C_3$ alkyl halide such as methyl chloride. Simultaneously, a solution of a Friedel-Crafts catalyst dissolved in a $C_1$ to $C_3$ alkyl halide (e.g., 0.2 weight percent of aluminum chloride in methyl chloride) is charged to reactor 1 via conduit 6. The concentration of the catalyst is maintained in the reactor at between about 0.01 to 0.50 weight percent and preferably between about 0.05 to 0.20 weight percent (e.g., 0.10 weight percent) based on total monomers by suitable regulation of the amount of recycled methyl chloride diluent to conduit 5 via conduit 8. The conversion of monomers to rubbery copolymer is maintained at about 50 to 90% and preferably at about 70 to 80% (e.g., 75%) by controlling the above feed to catalyst ratio. The polymer product quality is controlled by maintaining the polymerization temperature at a level of between about −80° to −120° C. (i.e., −120° to 180° F.) and preferably between about −90° and −107° C. (i.e., −130° to −160° F.), e.g., −95° C. (i.e., −140° F.). The reaction is carried out either under vacuum, pressure or atmospheric conditions, the general range advantageously being from about 10 to about 250 p.s.i.a. (e.g., 30 p.s.i.a.), the pressure being preferably regulated to a level of between about 5 and 50 p.s.i. above the pressure in flash drum 53 (e.g., a pressure of 10 p.s.i. above the pressure in the flash drum).

After completion of the reaction, a slurry of about 15 to 30 weight percent, preferably about 17 to 25 weight percent (e.g., 18 weight percent) of butyl rubber in methyl chloride is then overflowed from reactor 1 via conduit 7 to flash drum 53 which is fitted with an agitator 16. Flash drum 53 is maintained as will appear hereinafter, at a temperature level sufficiently high to vaporize the methyl chloride diluent and generally at a pressure of between about 5 and 50 p.s.i. below the pressure in reactor 1. For instance, flash drum 53 is advantageously operated at temperatures of between about 0° and 250° F., preferably between about 100° and 160° F. (e.g., 130° F.) and at pressures of between about atmospheric pressure and 200 p.s.i.g. (e.g., 5 p.s.i.g.). Simultaneously a superheated $C_5$ to $C_{10}$ hydrocarbon or mixture of such hydrocarbons (e.g., hexane) is injected in vapor form into flash drum 53 via conduits 9, 78, and 7. More particularly, hexane in liquid form is conveyed through conduit 9 past valve 72 through valve 74 into vaporizer-superheater 76 where the hexane is vaporized and superheated to 300° F. This superheated vapor is then passed through line 78 into conduit 7 where it contacts the reactor effluent stream and is conveyed with said stream into flash drum 53 wherein the hexane vapor condenses giving off sufficient heat to volatilize methyl chloride which is driven off overhead via conduit 15 as more fully described hereinafter.

The hydrocarbon solvent such as hexane may contain about 0 to 500 parts per million and especially 30 to 100 parts per million of water (e.g., 50 parts per million of water), i.e., sufficient water to deactivate the catalyst. Alternatively, a small amount of an oxygenated hydrocarbon such as an alcohol (e.g., isopropanol) or water may be either blended with the solvent vapor or injected directly into flash drum 53 to prevent "after polymerization." As beforementioned, the flash drum is maintained at a lower pressure than the pressure in the reactor. This is to force the slurry of butyl rubber copolymer in the methyl chloride from the reactor to the flash drum. Flash drum 53 may optionally be heated by any suitable heat exchange means such as a heating coil in the lower part of the flash drum (not shown) or the pump-around heat exchange system as shown which comprises outlet conduit 10, pump 11, conduit 12, heat exchanger 13, and inlet conduit 14. However, it is to be expressly understood that when using the hydrocarbon solvent in vapor form, preferably superheated to the degree hereinbefore mentioned, no auxiliary or additional heat exchange equipment of any type is normally needed in order for flash drum 53 to operate efficiently.

The temperature and pressure in flash drum 53 are regulated whereby to flash off a sufficient amount of methyl chloride diluent via conduit 15 to cause the butyl rubber copolymer to dissolve at a rapid rate in the hydrocarbon solvent such as hexane. About 70 to 100% (e.g., 85%) of the methyl chloride is generally removed. The butyl rubber dissolved in hexane is then withdrawn via conduit 18.

The butyl rubber solution may be drawn off via conduit 17 or conduit 21, blended while in solution, in accordance with the present invention, with pigments, fillers, oils, waxes, asphalts, resins, plasticizers, or the like, or chemically modified and ultimately introduced into conduit 19 via line 22.

Alternatively, for chemical modification, it is highly preferred and in some cases necessary to remove unsaturated materials other than the polymer. In this case, the dissolved butyl rubber copolymer may be withdrawn via line 17 and introduced near the top of a 20 to 50 plate (e.g., 25 plates) polymer stripping column (not shown) wherein the polymer solution passes down the column counter-current to upwardly rising solvent vapors, preferably supplied to the bottom of the column from an external source. The solvent vapors may optionally be superheated, if desired, to a temperature insufficient to cause thermal degradation of the polymer, generally up to not more than about 50° F. superheat. The vapor leaving the top of the column contains, in addition to solvent stripping vapors, unsaturated hydrocarbons such as unreacted monomer and essentially all remaining alkyl halide diluent, if any. The solvent vapors used for stripping may be obtained at least in part by separating out the unsaturated hydrocarbons and alkyl halide from the overhead products, the essentially pure solvent remaining being recycled in vapor form to the bottom of the polymer stripping column as the stripping medium.

Several advantages result from the operation described above. Degradation of polymer molecular weight is avoided by obviating the necessity for contacting the polymer solution with a heating medium in indirect heat exchange therewith. Also, a substantial reduction in heat exchange surface required results since the procedure outlined accomplishes the stripping operation without requiring the polymer solution to be heated in conventional heat transfer equipment.

The essentially olefin-free polymer solution, withdrawn from the bottom of the polymer stripping column, may be then chemically modified while dissolved in the solvent or the solution may be cooled and/or concentrated if necessary prior to chemical modification. This is advantageously accomplished by introducing the essentially olefin-free polymer solution, withdrawn from the polymer stripping column, into a flash zone maintained at a pressure substantially lower than the pressure in the polymer stripping column (e.g., atmospheric pressure) whereby cooling and concentration simultaneously occur due to the evaporation of a portion of the solvent. Alternatively, at least a portion of the stripping vapors may be obtained from flash drum 20, as more fully described hereinafter.

In any case, the solution of butyl rubber polymer or other polymer or copolymer in accordance with the present invention which has been blended with pigments, oils, waxes, asphalts, resins, plasticizers or the like or chemically modified is then introduced into hydrocarbon flash drum 20 via conduit 19. This solution generally contains about 2 to 20 weight percent, preferably about 5 to 15 weight percent (e.g., 10 weight percent) of dissolved rubbery copolymer. As the butyl rubber solution enters flash drum 20 via conduit 19, it is preferably steam atomized by atomizer 24 at a temperature level of between about 150° and 250° F. (e.g., 180° F.) and under pressures of between about 0 to 50 p.s.i.g. (e.g., 15 p.s.i.g.). Flash drum 20 is fed through water inlet 23 and is equipped with an agitator 25 which facilitates the production of a water slurry of modified butyl rubber copolymer. Hydrocarbon flash drum 20 is desirably operated at about 180° F. and 15 p.s.i.g. The vaporized hydrocarbon such as hexane is withdrawn via conduit 26 and is recovered as more fully described hereinafter. In an optional but preferred embodiment, additional low pressure steam is also injected into hydrocarbon flash drum 20 via conduit 27.

The resulting water slurry of butyl rubber generally contains about 1 to 5 weight percent polymer (e.g., 2.0 weight percent polymer) and is withdrawn from hydrocarbon flash drum 20 via conduit 28 to vacuum stripper 29 which is likewise equipped with agitator 30, low pressure steam conduit 31 and overhead vacuum steam jet recovery conduit 32. Stripper 29 is advantageously operated at about 120° to 160° F. (e.g., 140° F.) and at about 2 to 6 p.s.i.a. (e.g., 4 p.s.i.a.). The stripper serves to remove the last traces of hexane from the butyl rubber-water slurry and return the same to hydrocarbon flash drum 20 via conduits 32 and 33. The water slurry of butyl rubber is then withdrawn via conduit 34 and pumped by pump 35 through conduit 36 to various conventional butyl rubber finishing operations, e.g., filtering, extruding, drying, etc.

The hexane or other hydrocarbon solvent, in accordance with the process of the present invention, is recovered from flash drum 20 via line 26 through condenser 44 to separator 45. In separator 45 the heavier water layer is settled out via conduit 46. Residual methyl chloride vapors, if any, are vented through line 47. The remaining material which is substantially pure hydrocarbon solvent generally containing about 30 to 100 parts per million of water (e.g., 50 parts per million of water), is recycled via conduit 48 through pump 49 and conduit 9 past valve 72 through valve 74 into vaporizer-superheater 76. In superheater 76, the hexane vapor is superheated 140° F., i.e., to a temperature level of 300° F., and passed via line 78 through conduit 7 back into alkyl halide flash drum 53.

The alkyl halide diluent such as methyl chloride is recovered via line 15 by optionally compressing the vapors in a first stage compressor 54 to about 25 to 100 p.s.i.g. (e.g., 50 p.s.i.g.) discharge pressure, optionally drying the alkyl halide by introducing the same via conduit 55 to alumina drier 56 and optionally again compressing the alkyl halide to about 150 to 175 p.s.i.g. (e.g., 165 p.s.i.g.) in a second stage compressor 57. Alternatively, alkyl halide flash drum 53 is maintained under sufficient pressure that the alkyl halide diluent vapors are readily condensed by cooling water in indirect heat exchange therewith, thereby eliminating the necessity of compressors 54 and 57. In such a case, while the pressure in the alkyl halide flash drum 53 is at least about 5 to 50 p.s.i. lower than the pressure in the reactor, the pressure in the flash drum is also regulated to a pressure of at least between about 15 and 200 p.s.i.g. (e.g., about 50 p.s.i.g.). In this latter instance, the alkyl halide such as methyl chloride may be recovered via line 15 conduit 50, condenser 51, line 52, conduit 55, drier 56, conduit 58, second stage compressor 57, and conduit 38 into fractionating column or tower 37. A portion (e.g., 20 weight percent of the total) of the alkyl halide vapors condensed in condenser 51 may be returned in liquid form via conduit 61 to flash drum 53 as recycle to enrich the overhead vapor stream in alkyl halide passing out conduit 15. Alternatively, the alkyl halide may be recovered via line 15, conduit 50, condenser 51, line 59, conduit 58, second stage compressor 57, and conduit 38 into fractionating column or tower 37 or merely through conduits 15, 60 and 38 into fractionating column or tower 37.

In any case, the resulting alkyl halide stream is introduced into fractionating column or tower 37 via conduit 38. Fractionating column or tower 37 may be fitted with a reboiler and may contain about 20 to 100 plates (e.g., 50 plates). It desirably has a reflux ratio of between about 5 to 1 and 15 to 1 (e.g., 9 to 1). The overhead product comprises about 5 to 25 weight percent (e.g., 10 weight percent of the tower feed and is substantially pure methyl chloride. This overhead product is recycled via overhead conduit 39 to catalyst inlet conduit 6 leading to reactor 1 after having been blended with a desired amount of aluminum chloride catalyst from conduit 40. The bottoms from fractionating columns 37 are fed into second fractionating column 41 via conduit 42. Fractionating column 41 contains between about 10 and 40 plates (e.g., 20 plates)

and operates at a reflux ratio of about 0.5 to 1 and 3 to 1 (e.g., 1.5 to 1). The major proportion of the methyl chloride diluent is then withdrawn from fractionating column 41 via overhead conduit 3 and mixed with fresh monomer to be charged via line 5 to reactor 1. The alkyl halide leaving fractionating column 41 via line 8 contains about 3 to 8 weight percent (e.g., 5 weight perpercent of $C_4$ unsaturates such as isobutylene. The bottoms from fractionating column 41 are then introduced via conduit 43 to a 30 to 70 plate stripping column, e.g., a 50 plate stripping column (not shown), from which a small amount of methyl chloride (e.g., 1 weight percent based on the total) is recovered and recycled to conduit 8. The stripper bottoms are now free of methyl chloride and comprise additional amounts (e.g., 10 weight percent based on the total) of $C_4$ hydrocarbons which are conventionally purged as well as unreacted isoolefin (e.g., isobutylene) and multiolefin (e.g., isoprene) monomers. The unreacted isobutylene and isoprene are then recovered (after additional fractionation to split the stream into each respective material) by conventional isobutylene and isoprene units respectively.

During the time when reactor 1 is on stream as mentioned above, reactor 66 is off stream and is being cleaned as more fully described hereinafter. More particularly, a portion (e.g., 20 weight percent of the total hexane vapors are passed through valve 72 into condenser 80 where the vapors are condensed but maintained at a temperature level of between about 100° and 150° F. (e.g., 130° F.) The hot hexane liquid then passes through conduit 82 past closed valve 84 through open valve 86 into reactor 66 where the hexane dissolves butyl rubber occluded on the surfaces of the reactor and passes the same via conduit 88 into line 7 leading into the alkyl halide flash drum 53. After about 20 to 50 hours (e.g., 35 hours), the reactor surfaces of reactor 1 will have become sufficiently occluded or fouled with polymer deposits that it will be desirable to conduct the polymerization reaction in reactor 66 placing reactor 1 off stream for cleaning. At this time, valves 86, 90, 92, 94 and 104 are closed and valves 84, 96, 98, 100 and 102 are opened in order to place reactor 66 on stream. Reactor 1 is then off stream and is washed by hot hexane from conduit 82 through valve 84, the dissolved rubber formed being passed through valve 100 into conduit 88 leading into line 7 and introduced into the alkyl halide flash drum 53.

It has been observed that when practicing the processes of the present invention in accordance with this example, that the rubbery copolymer is dissolved much more rapidly than has ever been possible heretofore. Also, plugging of control valves with ice and methyl chloride hydrates have not been experienced. Analysis of recycle catalyst streams have shown negligible amounts of such reaction poisons as hydrochloric acid, methyl alcohol and dimethyl ether. It has also been observed that by the use of vapor hexane substantial savings in heat transfer equipment are obtained. Furthermore, the above described wash system to remove occluded catalysts from off stream reactors has proved a quick and effective means of not only cleaning the reactor but of saving both rubbery polymer and solvent.

Resort may be had to modifications and variations of the disclosed embodiments without departing from the spirit of the invention or the scope of the appended claims.

What is claimed is:

1. In a process for continuously dissolving isoolefin-containing polymeric materials in solvents, said polymeric materials being selected from the group consisting of homopolymers of $C_4$ to $C_8$ isoolefins, copolymers of $C_4$ to $C_8$ isoolefins with $C_4$ to $C_{14}$ multiolefins and copolymers of $C_4$ to $C_8$ isoolefins with a vinyl aromatic hydrocarbon, the combination which comprises contacting a slurry of said polymeric material in a $C_1$ to $C_3$ alkyl halide non-solvent liquid reaction diluent with an inert $C_5$ to $C_{10}$ hydrocarbon solvent in vapor form, which, when condensed in liquid form is a solvent for the polymer, to volatilize the non-solvent diluent and condense the solvent vapor to dissolve the copolymer in the solvent.

2. A process according to claim 1 in which the polymeric material is a homopolymer of a $C_4$ to $C_8$ isoolefin.

3. A process according to claim 1 in which the polymeric material is a rubbery copolymer of a $C_4$ to $C_8$ isoolefin and a $C_4$ to $C_{14}$ multiolefin.

4. A process according to claim 1 in which the polymeric material is a copolymer of a $C_4$ to $C_8$ isoolefin and a vinyl aromatic hydrocarbon.

5. A process according to claim 1 followed by condensing and recycling of the vaporized $C_1$ to $C_3$ alkyl halide non-solvent diluent in liquid form to produce additional polymer slurry.

6. In a process for continuously recovering isoolefin-containing polymeric materials by the use of solvents, said polymeric material being selected from the group consisting of homopolymers of $C_4$ to $C_8$ isoolefins, copolymers of $C_4$ to $C_8$ isoolefins with $C_4$ to $C_{14}$ multiolefins and copolymers of $C_4$ to $C_8$ isoolefins with a vinyl aromatic hydrocarbon, the combination which comprises contacting a slurry of said polymer in a $C_1$ to $C_3$ alkyl halide non-solvent liquid diluent with a $C_5$ to $C_{10}$ inert hydrocarbon in vapor form, which, when condensed in liquid form, is a solvent for said polymeric material, to volatilize the non-solvent diluent and dissolve the polymer in the $C_5$ to $C_{10}$ hydrocarbon solvent, and subsequently vaporizing said hydrocarbon solvent.

7. A process according to claim 6 in which the polymeric material is butyl rubber, a rubbery copolymer of a major portion of a $C_4$ to $C_8$ isoolefin and a minor portion of a $C_4$ to $C_{10}$ multiolefin.

8. A process according to claim 6 in which the polymeric material is polyisobutylene.

9. A process according to claim 6 in which the polymeric material is a copolymer of isobutylene and styrene.

10. A process according to claim 6 in which the vaporized $C_5$ to $C_{10}$ hydrocarbon solvent is recycled to volatilize additional $C_1$ to $C_3$ alkyl halide non-solvent liquid diluent.

11. A process according to claim 6 in which the $C_5$ to $C_{10}$ hydrocarbon solvent is vaporized by contact with a vapor of a liquid having a boiling point higher than said $C_5$ to $C_{10}$ hydrocarbon solvent.

12. A process according to claim 11 in which the higher boiling liquid is water.

13. A process according to claim 11 in which the higher boiling liquid is oil.

14. A process according to claim 6, followed by contacting the solution of polymeric material with additional $C_5$ to $C_{10}$ hydrocarbon solvent which has been superheated to a temperature level of about 100° to 250° C. in vapor form to remove any unreacted monomer whereby to form an essentially olefin-free solution of polymeric material.

15. A process according to claim 14 in which the polymeric material is butyl rubber, a rubbery copolymer of a major portion of a $C_4$ to $C_8$ isoolefin and a minor portion of a $C_4$ to $C_{10}$ multiolefin.

16. A process according to claim 14 in which the polymeric material is a copolymer of isobutylene and styrene.

17. A process according to claim 14 in which the essentially olefin-free polymer-containing solution is subsequently contacted with a halogenating agent.

References Cited in the file of this patent
UNITED STATES PATENTS
2,843,761   Rose et al. _____ May 13, 1958